United States Patent

[11] 3,574,954

| [72] | Inventors | Peter Schone<br>Stuttgart;<br>Horst Link, Boblingen; Manfred Berrer,<br>Stuttgart-Feuerbach, Germany |
|---|---|---|
| [21] | Appl. No. | 775,792 |
| [22] | Filed | Nov. 14, 1968 |
| [45] | Patented | Apr. 13, 1971 |
| [73] | Assignee | Franckh sche Verlagshandlung W. Keller &<br>Co.<br>Stuttgart-O, Pfizerstrasse, Germany |
| [32] | Priority | Feb. 9, 1968 |
| [33] |  | Germany |
| [31] |  | P 16 22 137.7 |

[54] OPTICAL EDUCATIONAL TOY
15 Claims, 13 Drawing Figs.

[52] U.S. Cl. ............................................... 35/19
[51] Int. Cl. ........................................... G09b 23/22
[50] Field of Search ............................... 35/19.2

[56] References Cited
UNITED STATES PATENTS

| 1,521,339 | 12/1924 | Taylor | 35/19 |
| 2,157,157 | 5/1939 | Anketell | 35/19 |
| 3,112,570 | 12/1963 | Vasconcellos | 35/19 |

*Primary Examiner*—Harland S. Skogquist
*Attorney*—Christen & Sabol

ABSTRACT: An optical educational toy comprising a plurality of lenses and diaphragms, mounts for the lenses and diaphragms, tube elements of various diameters for receiving and movably supporting the lenses, diaphragms and mounts in axial alignment, and connecting pieces and housings to permit the construction of various optical instruments such as a single lens reflex camera having a shutter mechanism comprising a mirror support and a shutter element connected together by a pawl which automatically releases upon depression of a button to expose film.

Patented April 13, 1971 3,574,954

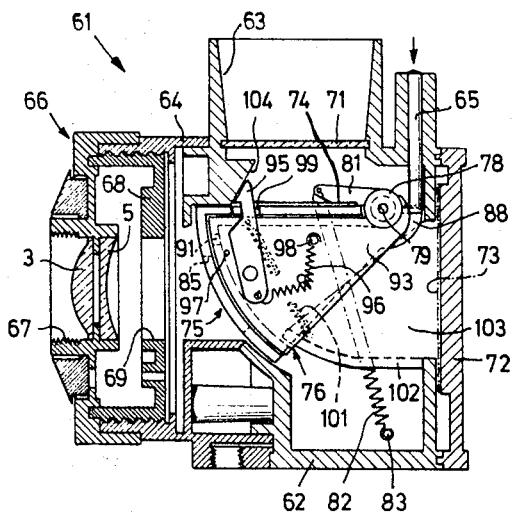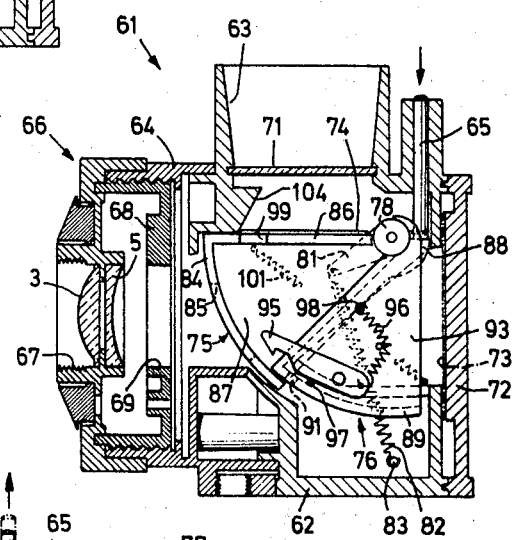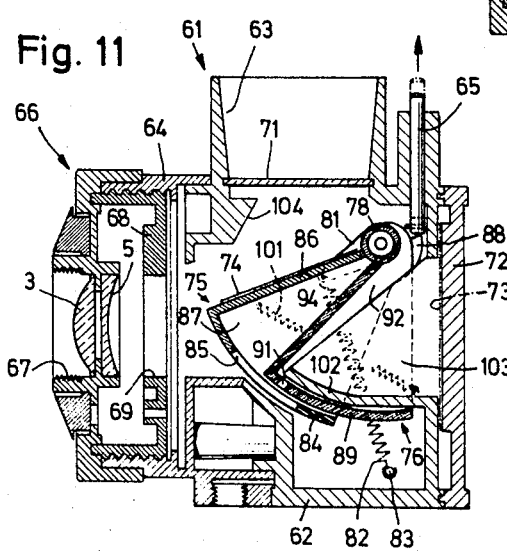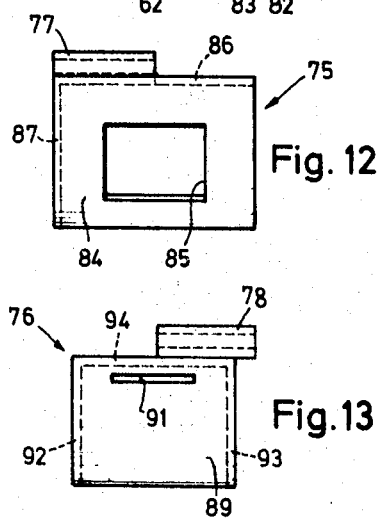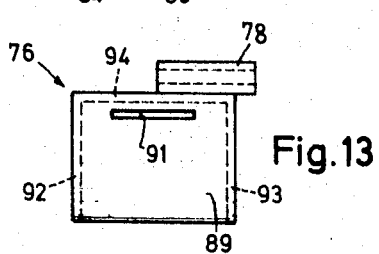

3,574,954

OPTICAL EDUCATIONAL TOY

BACKGROUND OF THE INVENTION

The present invention pertains to optical educational toys and more particularly to such toys which permit both optical experimentation and construction of optical instruments.

Conventional optical educational toys are limited in didactic value because they are normally constructed of parts which are specifically designed for specific optical instruments and are not interchangeable to permit the construction of various optical instruments. Thus, the education value of a camera, for instance, is limited to the operation of the specific camera, and a true understanding of the basic elements that form the camera is not easily achieved.

SUMMARY OF THE INVENTION

Accordingly, it is an object of the present invention to provide an optical educational toy comprised of individual parts to permit the construction of various optical instruments as well as to permit basic optical experimentation.

Another object of the present invention is to provide telescoping tube elements with an optical educational toy to permit movable and secure support for optical parts.

The present invention has another object in that the optical parts of an optical educational toy may be assembled to form a single lens reflex camera.

One advantage of the present invention is that the optical parts constituting the optical educational toy may be used to construct various optical instruments such as telescopes and cameras.

Another advantage of the educational toy according to the present invention is that a camera has a spring-loaded rotatable shutter element having a slit diaphragm and a spring-loaded mirror connected with the shutter element through a releasable locking device and that a release button is provided to cause the mirror to move along with the shutter element to a position where the locking device is automatically released to permit the shutter element to snap back and expose the film.

The present invention is generally characterized in an optical educational toy having lens means, diaphragm means and mounting means for the lens means and diaphragm means and comprising the improvement of tubular means for receiving the mounting means and movably supporting the mounting means in axial alignment therewith.

Further objects and advantages of the present invention will become apparent from the description of the preferred embodiments as shown in the accompanying drawings.

5 is a perspective view of the two halves of another tube element for use with the present invention.

Figure 6:
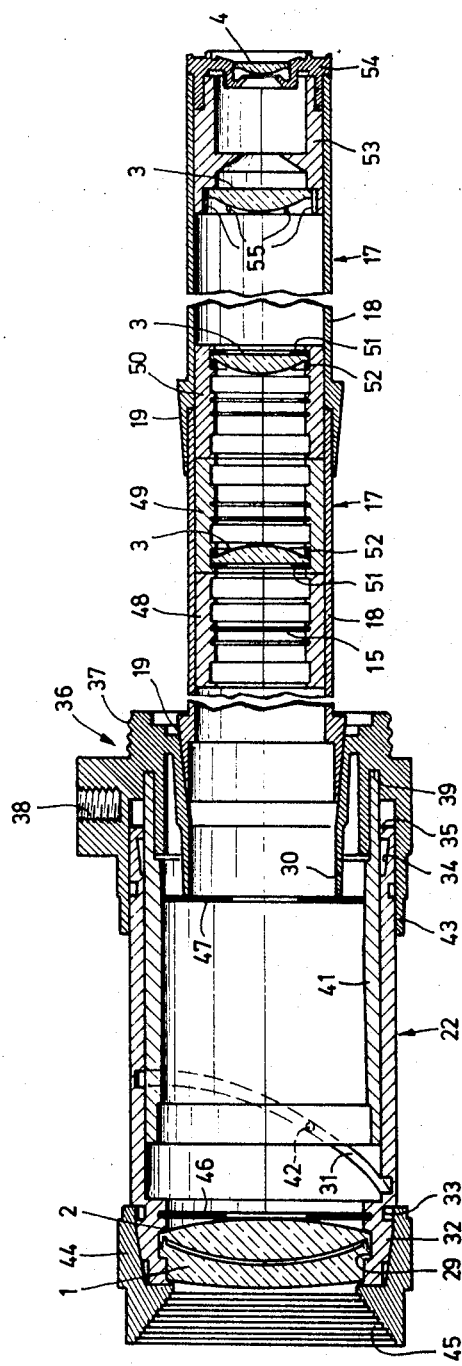

FIG. 6 is a side elevational view, in section, of a Kepler telescope constructed in accordance with the present invention.

Figure 7:
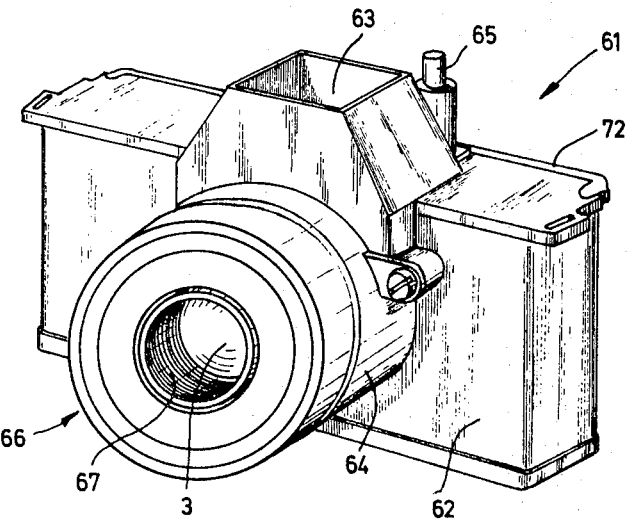

FIG. 7 is a perspective view of a camera constructed in accordance with the present invention.

FIGS. 8, 9, 10 and 11 are side elevational views, in section, of the camera of FIG. 7 during various stages of operation.

FIG. 12 is a front view of a mirror support for use with the camera of FIG. 7.

FIG. 13 is a front view of a shutter element for use with the camera of FIG. 7.

DESCRIPTION OF THE PREFERRED EMBODIMENTS

In a preferred design of an educational toy according to the present invention, at least two groups of tube elements of differing diameters may be telescoped into one another, may be assembled without use of intermediate pieces and may comprise two half shells which may be held together by engaging bulges and depressions or by a screw collar ring. Furthermore, the edges of the two half shells of a tube element lying on top of one another engage in a lighttight manner and prevent shifting. Furthermore, one end of the tube elements may have a conical flange whose inside diameter is equal to the outside diameter of the tube element.

The educational toy according to the invention, comprises at least two convex lenses made of the same transparent material whose focal lengths have a 2:1 relationship, and the lens with the smaller focal length has a smaller diameter than the lens with the greater focal length. A concave lens having a diameter equal to the above mentioned larger convex lens is also provided and together with the convex lens forms an achromatic lens assembly. An additional convex lens and concave lens of approximately the same diameter may be provided to form a further achromatic lens assembly having a diameter and a focal length greater than the diameter and focal length of the previously mentioned convex lenses.

Figure 1:
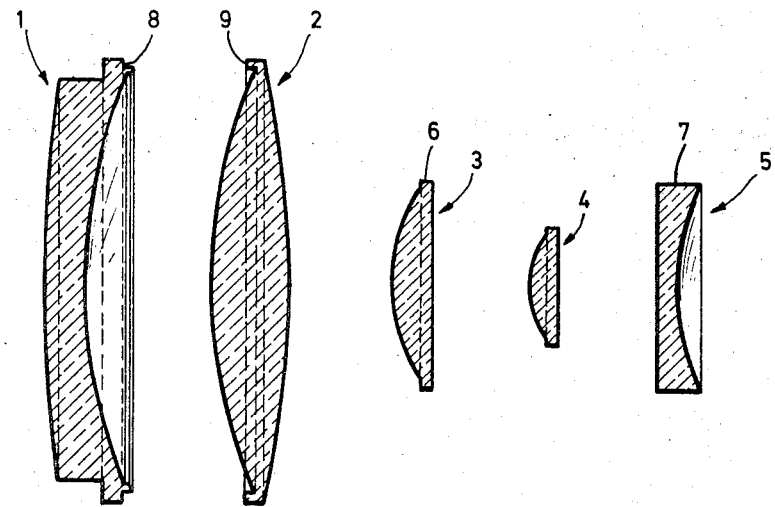
FIG. 1 is a side elevational view of a plurality of lenses for use with the present invention.

In FIG. 1 a set of lenses is illustrated and comprises five basic types of lenses for use with the present invention individually or in combination. A negative or concave lens 1 has a focal length $f_1$ of $-112.1$ mm. A positive or convex lens 2 has the same diameter as lens 1 and has a focal length $f_2$ of 61.1 mm. Lenses 1 and 2 are spaced and aligned in such a manner with respect to their optical characteristics that, when assembled, they form an achromatic lens assembly having a focal length $f_{1,2}$ of 131.5 mm. A further positive or convex lens 3 of a smaller diameter than lenses 1 and 2 has a focal length $f_3$ of 30 mm. By utilizing a pair of lenses 30a color corrected reversal lens assembly providing image reversal and a focal length $f_{3,3}$ of 30 mm. can be formed. Another convex lens 4 is provided having a diameter smaller than that of lens 3 and a focal length $f_4$ of 15 mm. The two positive lenses 3 and 4 are made of the same material and can be arranged together to form a Huygenian eyepiece with a focal length $f_{3,4}$ of 20 mm. A fifth lens in the form of a negative or concave lens 5 has a diameter equal to the diameter of the lens 3 and a focal length $f_5$ of $-43.9$. Lenses 3 and 5 are constructed and aligned in relation to one another with regard to their optical characteristics so that if combined they will form an achromatic lens assembly with a focal length $f_{3,5}$ of 71.5 mm.

Lenses 2, 3 and 4 may be constructed preferably from PLEXIGUM 7N of an optical quality having a refractive index of $n=1.492$ and an abbe number of 58.2. Lenses 1 and 5 may be constructed, for example, of Polystyrene VI of optical quality having a refractive index of $n-1.589$ and an abbe number of 30.6.

As can be seen from FIG. 1, lenses 1—5 have rectangularly shaped bearing edges 6 and 7 with which they may be inserted into corresponding grooves, mounts or tube elements to be described hereinafter. Lenses 1 and 2 have mating edges 8 and 9 that fit into one another and engage with one another whenever the above mentioned achromatic lens assembly is formed from these two lenses.

Figures 2, 3:
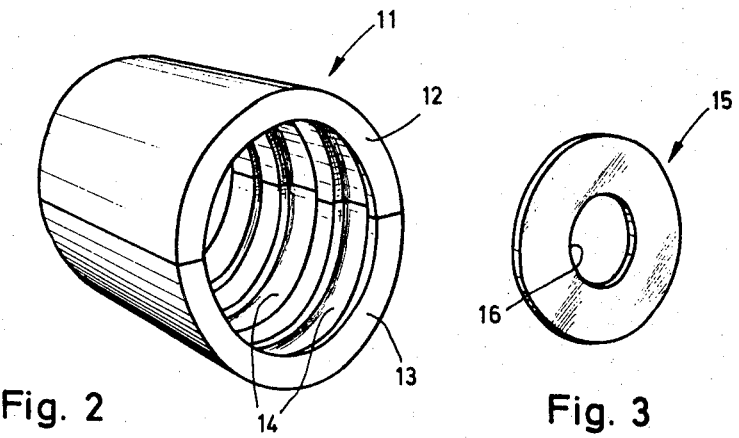
FIG. 2 is a perspective view of a mount according to the present invention.
FIG. 3 is a perspective view of a diaphragm according to the present invention.

In FIG. 2 a mount 11 for receiving lenses, diaphragms and other optical parts is shown and comprises two half shells 12 and 13 which are assembled with the help of mating pegs and holes engaging with one another and arranged on the edges lying on top of one another. Mount 11 has a smooth surface on its exterior and grooves 14 on its interior, and bearing edges 6 and 7 of lenses 3 or 5, for example, can be inserted into one of the half shells when the mount is disassembled and the other half shell may be replaced to secure the lenses.

FIG. 3 shows a simple disc diaphragm 15 having a diaphragm opening 16, and diaphragm 15 may also be inserted into mount 11 of FIG. 2. If the diaphragm or the bearing edge of the lens to be inserted is too narrow in comparison to groove 14, a ring can be inserted simultaneously with the diaphragm or the lens to fill the groove 14 and thus hold the diaphragm or lens securely in place.

Figure 4:
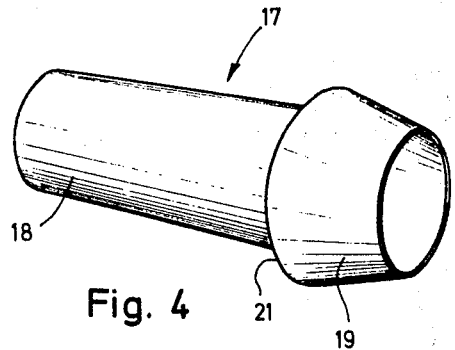
FIG. 4 is a perspective view of a tube element for use with the present invention.
Figure 5:
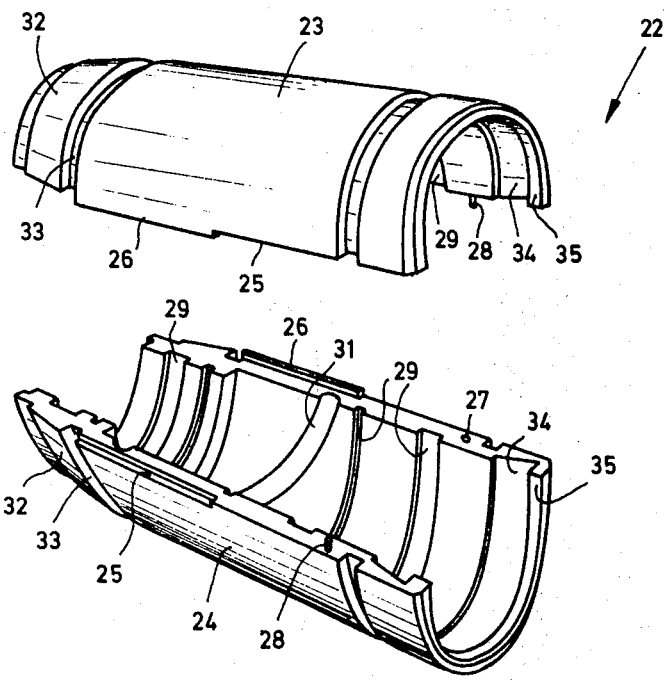

Tube elements for receiving the lenses, mounts and diaphragms shown in FIGS. 1, 2 and 3 are illustrated in FIGS. 4 and 5. The parts illustrated in FIGS. 1, 2 and 3 have been drawn at a scale of about 2:1; however the tube elements illustrated in FIGS. 4 and 5 are drawn to scale. Tube element 17 shown in FIG. 4 which, for example, may receive mount 11, has a straight cylindrical section 18 and a conical flange 19 which has been set off by a shoulder 21 from the straight cylindrical section 18. The inside diameter of flange 19 is equal to the outside diameter of the straight cylindrical section 18 so that flange 19 of a first tube element 17 may receive a straight cylindrical section 18 of a second tube element 17 in order to assemble a plurality of tube elements 17.

A tube element 22 is illustrated in FIG. 5 and includes two half shells 23 and 24, drawn in a separated state. Tube element 22 has a larger interior diameter than tube element 17 in order to receive lenses 1 and 2. Half shells 23 and 24 have notches 25 and bridges 26 on both sides in order to engage one another in the assembled state to provide a lighttight tube element that is securely assembled to prevent shifting. A plurality of mating holes 27 and pegs 28 are also provided in order to assure precise assembly of tube elements 22.

Tube element 22 has been illustrated in FIG. 5 as having notches 25 and bridges 26 and holes 27 and pegs 28; however, in practice tube element 22 will preferably include either one or the other type of the above mentioned connecting elements. When notches 25 and bridges 26 are used, bridge 26 extends only across a part of the edge while the remaining part of the edge is taken up by a notch 25, and these bridges and notches cooperate with corresponding complementary bridges and notches on the edge of the other half shell 24 to simultaneously form a lighttight assembly of the two half shells and secure against shifting.

As may be seen from FIG. 5 various grooves 29 have been provided on the inside surface of tube element 22, which grooves serve to receive lenses, diaphragms and other optical parts, and a strip of felt can be placed in grooves 29 to prevent the "rattling" of a further tube element pushed into tube element 22. The assembly of the lenses or diaphragms is accomplished in such a manner that first the lens or diaphragm is inserted into one half shell and the other half shell is placed on top of the one half shell.

In order to assemble a plurality of tube elements 22, one end of tube element 22 is provided with a section 32 on its exterior which is slightly conically and is succeeded by a depression 33. The opposite end of tube element 22 has on its interior surface a groove 34 with a bulge 35 which is slightly conical, and the end of a first half shell provided with a conical groove 34 is connected with the end of a second half shell, having the conical section 32 in such a manner, that the conical section 32 lies in the groove 34 and the bulge 35 engages the depression 33.

FIG. 6 illustrates an assembled educational toy according to the present invention; that is, a Kepler telescope composed of the parts described above as well as parts to be described hereinafter. Two tube elements 17 have been telescoped into one another in such a manner that the end of the tube element on the left engages the conical flange 19 of the tube element. The conical flange 19 of the left tube element has been inserted into a fitting recess of an intermediate piece 36, which also forms an element of the educational toy according to the present invention. The intermediate piece 36 has at its right end an externally threaded portion 37 to permit piece 36 to threadedly engage a lens cone of a camera, and intermediate piece 36 has an internally threaded bore 38 to permit the fastening of the intermediate piece to a stand or other supporting structure. The opening of the intermediate piece 36 receives the conical flange 19 and a socket 30 is provided for receiving the straight cylindrical section 18 of tube element 17 for other assemblies.

A cylindrical slot 39 is provided in the inside of the intermediate piece 36 in order to accommodate a further tube element 41 which preferably is constructed as one piece. The tube element 41 is encircled by an element 22, and a peg 42, provided on the outside wall of tube element 41 engages with a screw groove 31 provided on the inside wall of tube element 22 so that an axially directed translational motion may be obtained by rotating tube element 22.

The right end of tube element 22 is overlapped loosely by a projecting edge 43 of intermediate piece 36, and a screw collar ring 44 with a lens hood 45 is slipped onto the left end of tube element 22 so that ring 44 also serves to hold together the half shells forming the tube element 22.

The optical parts of the telescope comprise lenses 1 and 2 forming the above mentioned achromatic lens assembly and inserted into a groove 29 at the left end of the tube element 22, a diaphragm 46 inserted into a fitting groove in tube element 22, and a diaphragm 47 inserted in tube element 41. The tube elements 17, connected by the intermediate piece 36 with the tube element 41 and telescoped into one another, encompass three mounts 48, 49 and 50 of the kind shown in FIG. 2 comprising half shells 12 and 13. Mount 48 contains a disc diaphragm 15, and mount 49 contains a positive lens 3, which together with a further disc diaphragm 51 and a ring 52 is fitted into a single groove of mount 49. Correspondingly, mount 50 houses a positive lens 3, and the two lenses 3 held at the proper distance by mounts 49 and 50 form a reversal set. At the end of the socket 17 located on the right, an eyepiece is provided including two parts 53 and 54 mated together to support two positive lenses 3 and 4 which are disposed in the openings of parts 53 and 54 in a snug fit such that their edges abut longitudinal ribs 55 disposed on the inside of the parts. Thus it can be seen a Kepler telescope with an image reversal set of about 15 fold enlargement can be easily assembled from the parts of the present invention.

It is noted that the mounts 48, 49 and 50 are freely shiftable within the tube elements 17, and thus it is possible to investigate with the help of such tube elements 17 the influence of changes of distances of the lenses with regard to image quality, size of image and other optical characteristics which is a considerable advantage over conventional educational toys wherein lenses can only be attached fixedly at a single predetermined point of a tube or other support structure. Mounts may also be provided for lenses, diaphragms and other optical parts adapted to fit the wide tube elements 22 and 41, and thus mounts may be slideable in the tube elements in actual alignment.

Tube elements, mounts, intermediate pieces and other parts are made preferably from a slightly elastic plastic and have a dull black nonreflecting surface. In order to be able to shift the mounts easily in the tube elements, their insides are provided preferably with longitudinal ribs running axially. The number of pieces and the length of each of the various tube elements are coordinated with the focal length of the lenses such that various optical instruments may be constructed such as telescopes, microscopes, slides viewers and cameras.

In FIG. 7 a reflex camera 61 is shown which may be constructed from the parts of the optical educational toy according to the present invention. The reflex camera 61 includes a housing 62, a view finder 63, a lens cone 64 and a shutter button 65. A lens mount 66 is attached to lens cone 64 and has a standardized internally threaded portion 67 for receiving a commercial microscope lens. The camera consists of individual parts which can be assembled by the user of the educational toy in a simple manner.

The camera provided according to the present invention is a reflex camera and has the advantage that a complicated indicator mechanism for adjustment for distance is not required because the object that is to be photographed is depicted on the focusing screen provided in the view finder 63, and the picture may be adjusted sharply merely by shifting lens mount 66. A further advantage of the camera is to be found in the fact that it can accommodate film magazines for automatic insertion of film. Since such operation is known in the art, it need not be discussed here in more detail.

The lens cone 64 is constructed such that further parts of the educational toy, for example, a telephoto lens, which is constructed corresponding to the left part of the telescope of FIG. 6 can also be attached instead of lens mount 66. For this purpose the intermediate piece 36 and the lens mount 66 have the same diameter exterior thread 37 to cooperate with the inside thread of the lens cone 64.

The camera housing 62 may be used as the lower part of a microscope with a rotatable mirror disposed in the housing as a reversing mirror for incident light as will be described hereinafter.

FIGS. 8, 9, 10 and 11 show the camera of FIG. 7 in various sectional views. As can be seen from FIG. 8, two lenses 3 and 5 have been inserted into the lens mount 66 to form an achromatic lens assembly. The lens mount 66 has a rear wall 68 with an exposure opening 69, and, in the space between rear wall 68 and concave lens 5 a conventional iris diaphragm may be inserted. A focusing screen 71 is disposed in view finder 63, and camera housing 62 has a removable back wall 72 against which fits the film 73 coming from the magazine (not shown) with the coated side facing lens mount 66.

Camera 61 includes a mirror support 75 serving as a mounting for a mirror 74, and a shutter element 76 arranged inside support 75, which are shown in FIGS. 12 and 13 in front view, respectively. Mirror support 75 and shutter element 76 have approximately the shape of circular sectors, are connected by means of bushings 77 or 78 (FIG. 12 and 13) and are rotatably mounted on a shaft 79 rigidly supported in the camera housing 62. A lever arm 81 projecting freely upward is fastened to shutter element 76, and a spiral spring 82 is attached to lever arm 81 at one end and at the other end to a peg 83 fixed in the housing. The spiral spring 82 is disposed in tension in order to bias lever arm 81 and shutter element 76 downward into the position shown in FIG. 8.

The mirror support 75 comprises a front wall 84 which forms a part of a cylinder jacket and has a rectangular opening 85. An upper wall 86 as well as a side wall 87 connect front wall 84 with bushing 77, and an extension 88 is connected rigidly with mirror support 75 and is in abutting relationship with a peg shaped shutter release button 65 at its lower end.

Shutter element 76 has a cylindrically arched front wall 89 with a slit diaphragm 91, side walls 92 and 93 in the shape of a circular section, and a rectangular upper wall 94 extends rearward from front wall 89. The upper wall 94 is connected with bushing 78.

A pawl 95 is rotatably disposed on sidewall 93 of shutter element 76, as shown in FIG. 9, which is biased by means of a spiral spring 96 against a stop 97 extending from sidewall 93. Spiral spring 96 has an end facing away from the pawl 95 supported on a bolt 98 extending from sidewall 93 of shutter element 76. Pawl 95 extends through a recess 99 provided on upper wall 86 of mirror support 75, and in this manner mirror support 75 and shutter element 76 are connected into one unit such that movement of mirror support 75 causes movement of shutter element 76.

A third spiral spring 101 is attached at one end to mirror support 75 and at the other end to shutter element 76. Spiral spring 101, which is weaker than spiral spring 82, biases mirror support 75 toward shutter element 76.

An arched projection 102 is disposed at the rear of housing 62 and has circular sector shaped sidewalls 103, which extend from the rear into shutter element 76 and which serve to shield film 73 from light.

The operation of the shutter mechanism of camera 61 will be explained with reference to FIG. 8 which shows the position of the shutter mechanism during sighting of the object that is to be photographed, FIG. 9 which shows the shutter mechanism in a cocked position, FIG. 10 which shows the position of the shutter mechanism immediately after exposure of the film, and FIG. 11 which shows the movement of mirror support 75 after releasing button 65.

Figure 8:
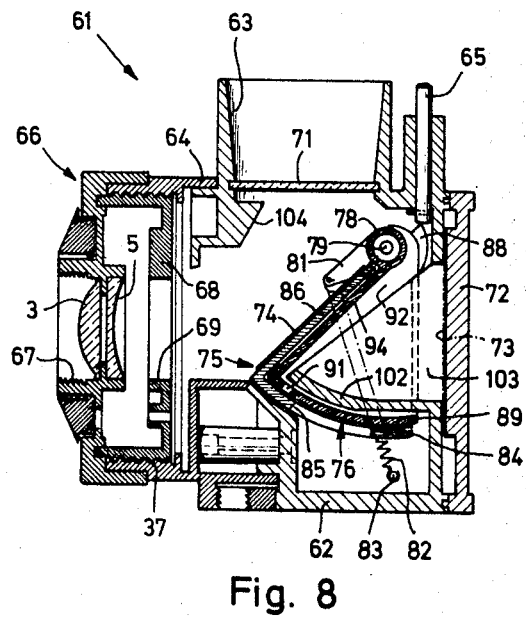

The image of the object is depicted by lenses 3 and 5 after reflection by mirror 74 on focusing screen 71 as shown in FIG. 8 and critical focusing is accomplished through twisting of lens mount 66. In the sighting position spiral spring 82 holds lever arm 81 and shutter element 76 down, and mirror support 75 is held down by the lack of tension on spring 101 and is connected with shutter element 76 through pawl 95.

When button 65 is depressed, which engages extension 88 at its lower end, mirror support 75 and shutter element 76 are moved upward against the tension of spring 82. During this time no exposure of the film takes place because opening 85 of mirror support 75 is covered by front wall 89 of shutter element 76 and slit diaphragm 91 is hidden behind the edge of opening 85. In this position mirror 74 has been removed from the optical path so that no image is visible on focusing screen 71.

When mirror support 75 has reached uppermost position pawl 95 is pushed out of its rest position by an oblique abutting surface 104 on housing 62, and the connection between mirror support 75 and shutter element 76 is broken, so that the latter can swing quickly downward under the influence of the cocked spiral spring 82 to move slit diaphragm 91 past the opening 85 in mirror support 75 to expose the film 73.

As shown in FIG. 10 mirror support 75 remains at its uppermost position due to button 65 which is still depressed. The spiral spring 82 has retracted shutter element 76 to its starting position and thereby cocks the weaker spiral spring 101. Further exposure of the film 73 is impossible in this position because upper wall 94 of shutter element 76 prevents light from entering through opening 85.

When the pressure on button 65 ceases, mirror support 75 is pulled downward into its starting position by the action of spiral spring 101 and simultaneously button 65 is pushed upward. During the return of mirror support 75 to shutter element 76, pawl 95 is automatically reinserted into recess 99 and is locked behind the upper side of mirror support 75 through the action of spring 96, and the camera is returned to the sighting position shown in FIG. 8.

Thus, it can be seen that the optical educational toy according to the present invention permits a variety of experiments with mirrors, lenses, focusing screens and other optical parts as well as the construction of magnifiers, slide viewers, Galileo telescopes, Kepler telescopes with and without reversal sets, and reflex cameras with interchangeable optical parts so that laymen, especially juveniles, can be acquainted in an easily understandable manner with the essence of modern optical instruments. The combination of experimenting materials and the reciprocal balancing of the individual parts makes it possible to illustrate optical principles and to construct properly functioning model instruments with the same apparatus.

In as much as the present invention is subject to many variations, modifications and changes in detail, it is intended that all matter described in the foregoing specification or shown in the accompanying drawings shall be interpreted as illustrative and not in a limiting sense.

We claim:

1. An optical educational toy having lens means, diaphragm means, tubular means for the lens means and diaphragm means and mounting means for receiving and movably supporting said tubular means in axial alignment therewith, said lens means including a first convex lens and a second convex lens consisting of the same material, the respective focal lengths of said first convex lens and said second convex lens having a relationship of 2:1 and said first convex lens having a greater diameter than said second convex lens, said lens means further including a first concave lens having a diameter equal to the diameter of said first convex lens whereby said first convex lens and said first concave lens may form an achromatic lens assembly, and said lens means further including a third convex lens and a second concave lens, said third convex lens and said second concave lens having equal diameters greater than the diameter of said first convex lens whereby said third convex lens and said second concave lens may form an achromatic lens assembly, said tubular means including means for positioning selected lenses therein, whereby a plurality of optical instruments may be selectively assembled from said elements.

2. The invention as recited in claim 1 wherein said tubular means includes first tubular means having a first diameter and second tubular means having a second diameter greater than said first diameter whereby said first and second tubular means may be telescoped into each other.

3. The invention as recited in claim 2 and further comprising connecting means for joining said first tubular means with said second tubular means.

4. The invention as recited in claim 1 wherein said tubular means includes a first semicylindrical shell and a second semicylindrical shell adapted to be assembled in abutting relationship to form a tubular element.

5. The invention as recited in claim 4 wherein said first and second semicylindrical shells are fastened together by mating bulges and depressions.

6. The invention as recited in claim 4 wherein said first and second semicylindrical shells are fastened together by a screw collar ring.

7. The invention as recited in claim 4 wherein said first and second semicylindrical shells have edges which engage each other in a lighttight and immovable manner.

8. The invention as recited in claim 1 wherein said tubular means includes a tube element having a cylindrical body and a conical flange at one end of said body, said conical flange having an opening with an inner diameter equal to the outer diameter of said body.

9. The invention as recited in claim 1 wherein said mounting means includes a mounting having first and second semicylindrical shells.

10. The invention as recited in claim 1 wherein said mounting means includes a plurality of mounts having grooves therein, said tubular means includes a plurality of tube elements having grooves therein, and said first, second and third convex lenses and said first and second concave lenses have supporting edges adapted to fit said mount and tube element grooves.

11. The invention as recited in claim 1 and further including a housing for a camera, means for coupling said tubular means with said housing and a lens cone connected with said tubular means whereby a single lens reflex camera may be assembled.

12. The invention as recited in claim 11 and further comprising shutter means having a slit diaphragm, spring means for biasing said shutter means in a first position, mirror means, pawl means connecting said mirror means with said shutter means, release means for causing said mirror means to move said shutter means from said first position to a second position and means for disconnecting said pawl means when said shutter means is in said second position whereby said shutter means returns to said first position and exposes film.

13. The invention as recited in claim 12 and further including an internally threaded lens mount for receiving a microscopic lens.

14. The invention as recited in claim 11 wherein said mounting means, said tubular means and said camera housing are constructed of plastic and have nonreflective surfaces.

15. The invention as recited in claim 1 wherein said tubular means includes a first tube element having a helical groove on its inner surface, and a second tube element having a peg disposed on its outer surface, said second tube element being inserted in said first tube element so that said peg rides in said helical slot.